United States Patent
Paredes et al.

(10) Patent No.: US 10,683,985 B2
(45) Date of Patent: Jun. 16, 2020

(54) SECURITY LIGHT WITH DIFFUSING LIGHT PANEL

(71) Applicant: HeathCo LLC, Bowling Green, KY (US)

(72) Inventors: Apollo Paul Paredes, Livonia, MI (US); Scott Blaise Tylicki, Bowling Green, KY (US); Amer Salihovic, Bowling Green, KY (US)

(73) Assignee: Heathco LLC, Bowling Green, KY (US)

( * ) Notice: Subject to any disclaimer, the term of this patent is extended or adjusted under 35 U.S.C. 154(b) by 0 days.

(21) Appl. No.: 16/250,552

(22) Filed: Jan. 17, 2019

(65) Prior Publication Data

US 2019/0226657 A1    Jul. 25, 2019

Related U.S. Application Data

(60) Provisional application No. 62/619,532, filed on Jan. 19, 2018.

(51) Int. Cl.
| | |
|---|---|
| *F21V 17/00* | (2006.01) |
| *F21V 3/04* | (2018.01) |
| *F21V 17/02* | (2006.01) |
| *F21V 23/00* | (2015.01) |
| *F21V 7/00* | (2006.01) |
| *F21V 29/70* | (2015.01) |
| *F21W 131/10* | (2006.01) |
| *F21Y 115/10* | (2016.01) |

(52) U.S. Cl.
CPC ............ *F21V 3/049* (2013.01); *F21V 7/0091* (2013.01); *F21V 17/02* (2013.01); *F21V 23/003* (2013.01); *F21V 29/70* (2015.01); *F21W 2131/10* (2013.01); *F21Y 2115/10* (2016.08)

(58) Field of Classification Search
CPC ............ F21W 2131/10; F21V 23/0457; F21V 23/0471; F21V 23/0442; F21V 3/0625; F21V 11/183; F21V 11/18; F21V 3/049; F21V 7/0091; F21V 17/02; F21V 5/02; Y10S 362/802; G02B 6/0036; G02B 6/0038; G02B 6/0043
See application file for complete search history.

(56) References Cited

U.S. PATENT DOCUMENTS 5,575,549 A * 11/1996 Ishikawa .............. G02B 6/0025
                                                         362/330
5,828,683 A    10/1998 Freitas
(Continued)

FOREIGN PATENT DOCUMENTS

CN    101943357 A    1/2011
CN    202708988 U    1/2013
(Continued)

*Primary Examiner* — Y M. Lee
(74) *Attorney, Agent, or Firm* — Kelly Hollowell; 21st Century IP, LLC

(57) ABSTRACT

A security light having a first and a second light panel is set forth. The light panels includes a plurality of light scattering structures which are V-shaped grooves extending from the top surface to the bottom surface along the height of each of the light panels. The light scattering structures may modify in density as the distance from the light source increases in order to improve the light output performance of the panes.

11 Claims, 4 Drawing Sheets

(56) References Cited

U.S. PATENT DOCUMENTS

| | | | |
|---|---|---|---|
| 6,633,722 B1* | 10/2003 | Kohara | G02B 6/0061 |
| | | | 385/146 |
| 7,246,931 B2 | 7/2007 | Hsieh et al. | |
| 7,278,766 B2 | 10/2007 | Machi et al. | |
| 7,826,698 B1 | 11/2010 | Meir et al. | |
| 8,349,225 B2 | 1/2013 | Yue | |
| 8,400,585 B2 | 3/2013 | Shinohara et al. | |
| 8,419,263 B2 | 4/2013 | Wang et al. | |
| 8,721,152 B2 | 5/2014 | Coleman et al. | |
| 8,783,898 B2 | 7/2014 | Coleman et al. | |
| 8,794,812 B2 | 8/2014 | Coleman et al. | |
| 8,864,360 B2 | 10/2014 | Parker et al. | |
| 9,091,411 B2 | 7/2015 | Huang et al. | |
| 9,128,222 B1 | 9/2015 | Linblad et al. | |
| 9,521,727 B1* | 12/2016 | Clements | H05B 37/0227 |
| 2004/0246723 A1* | 12/2004 | Graves | F21V 23/0442 |
| | | | 362/276 |
| 2009/0161369 A1 | 6/2009 | Regev et al. | |
| 2010/0033989 A1* | 2/2010 | Teng | G02B 6/0038 |
| | | | 362/625 |
| 2010/0208469 A1 | 8/2010 | Shani | |
| 2011/0038177 A1 | 2/2011 | Kuwayama | |
| 2013/0272024 A1 | 10/2013 | Yao | |
| 2014/0268864 A1* | 9/2014 | Lee | G02B 6/0008 |
| | | | 362/558 |
| 2014/0272329 A1 | 9/2014 | McCollum et al. | |
| 2014/0313776 A1* | 10/2014 | Grigore | G02B 6/0091 |
| | | | 362/634 |
| 2015/0226902 A1 | 8/2015 | Ballard et al. | |
| 2015/0355406 A1* | 12/2015 | Blessitt | G02B 6/0055 |
| | | | 362/607 |
| 2016/0033704 A1 | 2/2016 | Sahlhoff et al. | |
| 2016/0033712 A1 | 2/2016 | Sahlhoff et al. | |

FOREIGN PATENT DOCUMENTS

| | | |
|---|---|---|
| EP | 0534140 A1 | 3/1993 |
| EP | 0962694 A1 | 12/1999 |
| EP | 2362447 A2 | 8/2011 |
| JP | 2002323347 A | 11/2002 |
| KR | 200361074 Y1 | 9/2004 |
| WO | 2008103437 A1 | 8/2008 |
| WO | 2011070161 A1 | 6/2011 |
| WO | 2018013535 A1 | 1/2018 |

* cited by examiner

SECURITY LIGHT WITH DIFFUSING LIGHT PANEL

BACKGROUND

Outdoor security lighting are commonplace for outdoor environments. These designs however are typically visible during the daylight hours and are obtrusive in their appearance. These security lights further have limited control of the actual light output of individual light heads and illumination systems.

SUMMARY

In some embodiments, a security light may comprise a mounting base electronically coupled to a sensor head. In various embodiments, the security light may comprise a first and second light panel coupled to the mounting base. In addition, in some embodiments, each one of the first and second light panel include a proximal end and a distal end. In some embodiments, each of the first and second light panel includes a top and bottom surface and a front and back surface extending between the proximal end and the distal end. In various embodiments, the security light may include at least one heat sink adjacent the proximal end of each of the first and second light panels. In some embodiments, the proximal end of each of the first light panel and the second light panel each are adjacent a plurality of LEDs. Moreover, in some embodiments, the back surface of each of the first and second light panel include a plurality of V-shaped recesses increasing in density with increasing distance from the proximal end towards the distal end, wherein the plurality of V-shaped recesses extend between the top surface and the bottom surface.

In addition, in some embodiments, the plurality of V-shaped recesses extend through each of the top surface and the bottom surface. In various embodiments, each of the plurality of V-shaped recesses include two angled surfaces, wherein the two angled surfaces are 95 degrees from each other. In some embodiments, each of the first and second light panels include about an 80 percent front illumination and about a 20 percent wall wash illumination. Moreover, in some embodiments, the proximal end of each of the first and second light panel are adjacent each other and extend away from each other in opposing directions towards the distal end of each respective first and second light panel. In some embodiments, the proximal end of the first light panel may be connected to a first support arm extending from the mounting base and the proximal end of the second light panel may be connected to a second support arm extending from the mounting base. In various embodiments, the first light panel and the second light panel move independently of each other. In some embodiments, at least one heat sink includes a first heat sink adjacent the proximal end of the first light panel and a second heat sink adjacent the proximal end of the second light panel. In addition, in various embodiments, the distal end of each of the first and second light panels have a region without the plurality of V-shaped recesses. In some embodiments, each one of the first and second light panels includes a flange adjacent the proximal end. In various embodiments, each of the plurality of V-shaped recesses includes a bottom, wherein the bottom extends between the top surface and the bottom surface. Moreover, in some embodiments, the bottom of each one of the plurality of V-shaped recesses may be a depth of about 0.4 inches from the back surface. In various embodiments, each one of the first and second light panels are translucent.

In some embodiments, a security light may comprise a mounting base electronically coupled to a sensor head. In various embodiments, the security light may include one or more light panels coupled to the mounting base. In some embodiments, each one of the one or more light panels may include a proximal end and a distal end. In addition, in various embodiments, each of the one or more light panels may include a first surface with adjacent opposing surfaces extending between the proximal end and the distal end. In various embodiments, the security light may include at least one heat sink adjacent the proximal end of each of the one or more light panels. In some embodiments, the proximal end of each of the one or more light panels each are adjacent a plurality of LEDs. In various embodiments, the first surface of each of the one or more light panels may include a plurality of elongated recesses increasing in density with increasing distance from the proximal end towards the distal end. In some embodiments, the plurality of elongated recesses may extend between the opposing surfaces across the first surface. Moreover, in various embodiments, the elongated recesses may be V-shaped and extend through the opposing surfaces.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" or "illumination source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. A given unit may have any one of a variety of mounting arrangements for the light source(s), enclosure/housing arrangements and shapes, and/or electrical and mechanical connection configurations. Additionally, a given unit optionally may be associated with (e.g., include, be coupled to and/or packaged together with) various other components (e.g., control circuitry) relating to the operation of the light source(s). An "LED-based fixture" refers to a lighting unit that includes one or more LED-based light sources as discussed above, alone or in combination with other non LED-based light sources. A "multi-channel" lighting unit refers to an LED-based and/or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), field-programmable gate arrays (FPGAs), and discrete logic.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
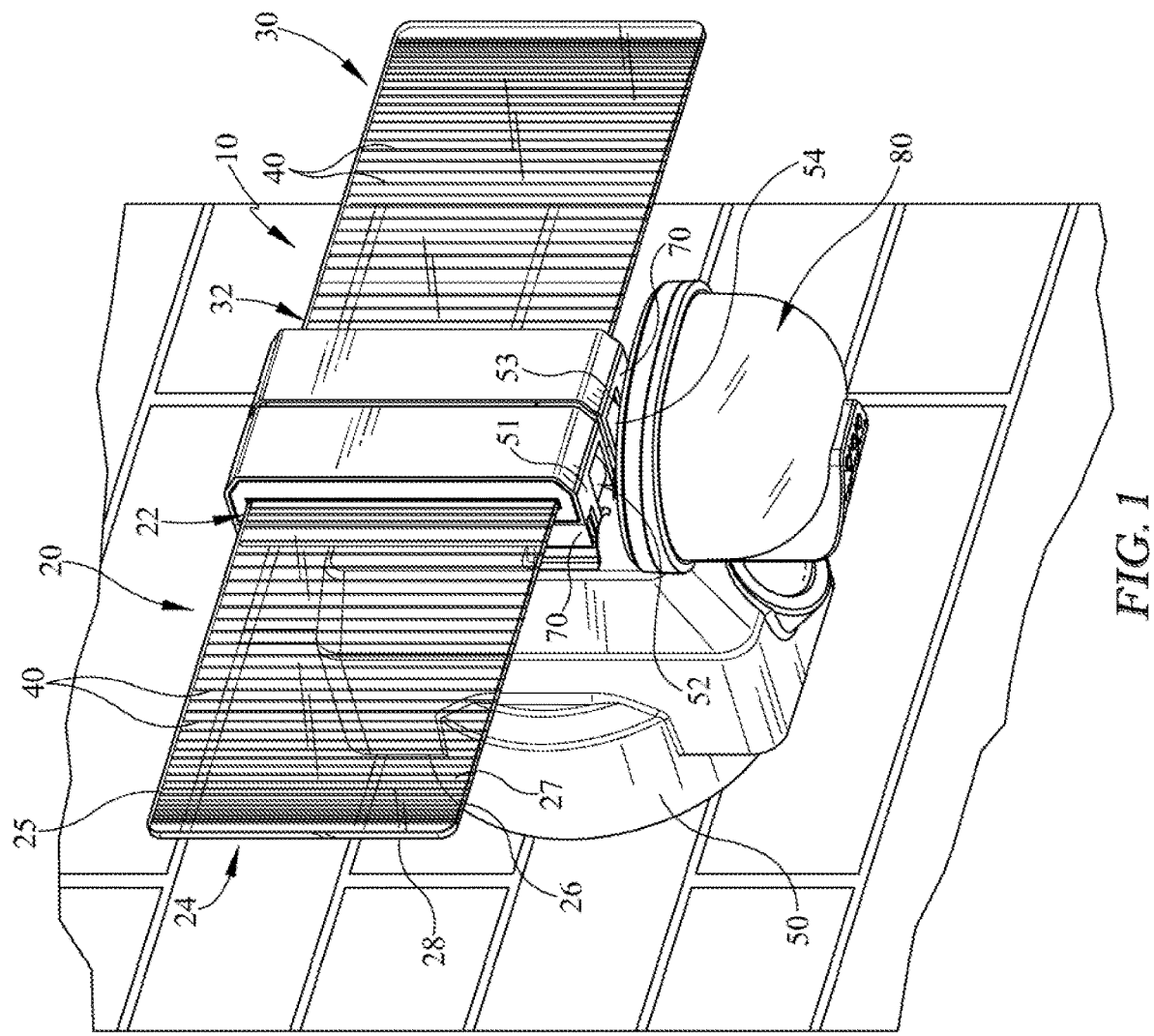
FIG. 1 illustrates a perspective view of an implementation of the security light described herein.

It is to be understood that a security light is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Turning to the Figures, FIG. 1 illustrates an example of a security light 10 described herein. Included in this implementation is a first light panel 20 and a second light panel 30. In some embodiments, one or more light panels may be used. Each of the first and second light panels 20, 30 may be connected to a mounting base 50 by first and second control arms 52, 54.

Each of the light panels 20, 30 may be substantially similar and, for sake of brevity, reference will be made to the first light panel 20. Alternatively, in varying embodiments, the first light panel and the second light panel may be modified for particularized light output depending upon the illumination requirements. In some embodiments, the first light panel may provide a first photometric light output which is the same as the second light panel. In other embodiments, the first light panel may provide a photometric light output that differs from the second light panel. For example, the first light panel may have a photometric distribution that provides an emphasis on downlight built into the panel as a result of placement of the grooves. Alternatively, the second light panel may provide more outward throw distribution for wide-area lighting. Other variants and embodiments of mixing photometric distributions adjusted by the specific shapes of the grooves formed in the panels may be implemented.

As shown in the Figures, the first light panel 20 includes a proximal end 22 and an opposing free or distal end 24. The first light panel 20 includes a top surface 25, bottom surface 26, front surface 27, and a back surface 28 extending between the proximal end 22 and the distal end 24. Distal end 24 of the first and the second light panel may include a reflective surface to allow reflection of any remaining light back into the internal light guide formed by the respective light panel. Each of the light panels is translucent and allows light to internally reflect within the panel due to characteristics of the material construction. Typically light panels allow for total internal reflection wherein the light is allowed to reflect internally within the boundaries of the light panel and which thereby allows light to exit the light panel/light guide by virtue of positioned disruption surfaces formed on a surface or internally of the light guide/light panel. These disruption surfaces, as depicted in the various embodiments, are v-shaped recesses but can be made in other forms including light disruption features formed internally or positioned internally within the material forming the light panel/light guide. The disruption surfaces and/or materials can be positioned in various locations within the light panel depending upon the desired interruption desired for allowing light to exit via any surface of the light panel. However, in this way, photometric light output can be controlled and maintained by positioning of the features through various positions apart from those that are shown in the exemplary embodiments of the present embodiments and figures.

Figure 2:
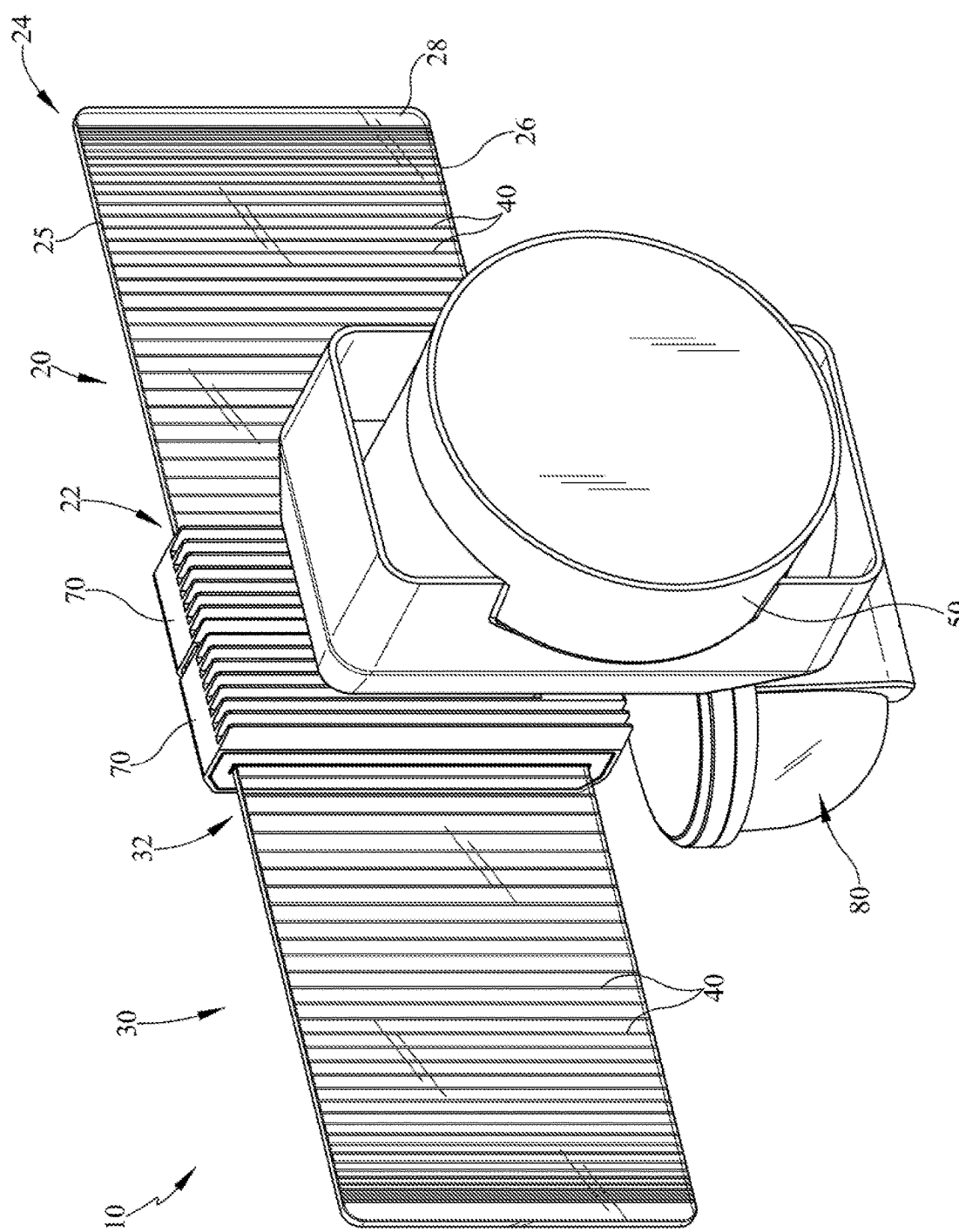
FIG. 2 illustrates a rear perspective of the security light described herein.

The first light panel 20 may include a plurality of light scattering structures distributed on the back surface 28 as is depicted in the embodiment and example of FIG. 2. A density of the plurality of the light scattering structures increases with increasing distance from the proximal end towards the distal end. The plurality of light scattering structures may be a plurality of elongated recesses having a variety of profiles along their length (e.g. D-shaped, V-shaped, truncated, etc.). In the one embodiment shown in FIG. 4A, the light scattering structures is a plurality of V-shaped recesses or channels 40. In the one embodiment, shown in FIGS. 3 and 4 the distal end 24 of the first light panel includes a region 21 without the plurality of V-shaped recesses. As shown, the V-shaped recess 40 may be spaced away from the distal end 24 creating region 21. As is readily apparent to one of ordinary skill in the art, the absence of light scattering structures 40 in region 21 located on the distal end 24 of light panel 20, decreases the light emitting out the distal end 24 of the light panel 20 onto the mounting wall or surface, called wall wash illumination, and increases the light emitting out the front surface 27 of light panel 20 providing front illumination. The V-shaped recesses 40 extend between the top surface 25 and the bottom surface 26. Each V-shaped recess 40 may extend through the top surface 25 and/or the bottom surface 26. As more clearly shown in FIGS. 4 and 4A, in some embodiments, the V-shaped recess 40 extends through both the top surface 25 and the bottom surface 26.

Figure 4A:
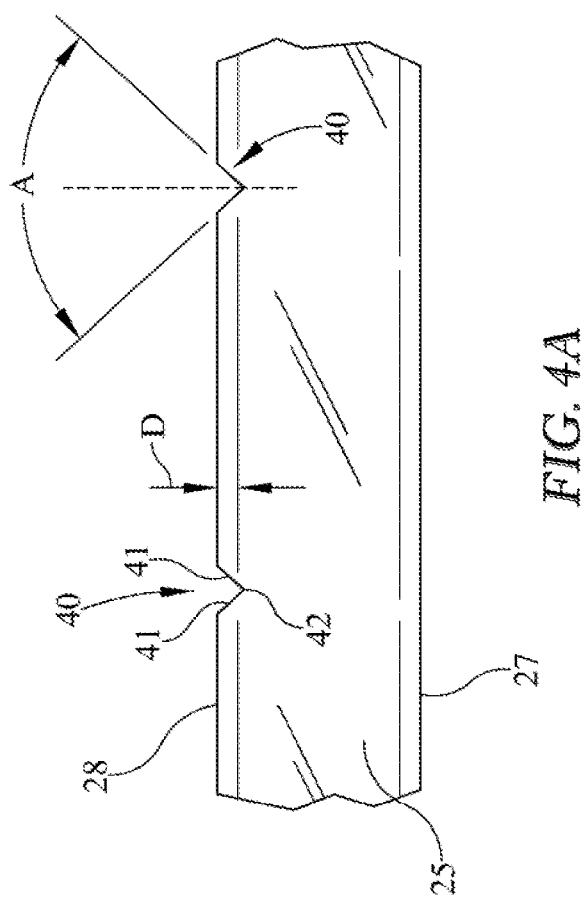
FIG. 4A illustrates an enlarged view of the light panel of FIG. 4.

The V-shaped recess 40 may include two angled surfaces 41 extending towards a bottom 42. As shown in the embodiment, in FIGS. 4 and 4A, the bottom 42 may be a continuous line or surface extending between the top surface 25 and bottom surface 26. The bottom 42 may be a depth D of about 0.4 inches from the back surface 28 or planar surface. The angled surfaces 41, as illustrated in FIG. 4A, may be a variety of angles A from each other. However, in the one embodiment shown, the angle A may be about 95 degrees. Stated alternatively, the angled surfaces 41 are about 47.5 degrees from the vertical or normal to the planar back surface 28. Each V-shaped recess 40 may be substantially perpendicular to the direction between the proximal end 22 towards the distal end 24 or light source 60.

Figure 4:
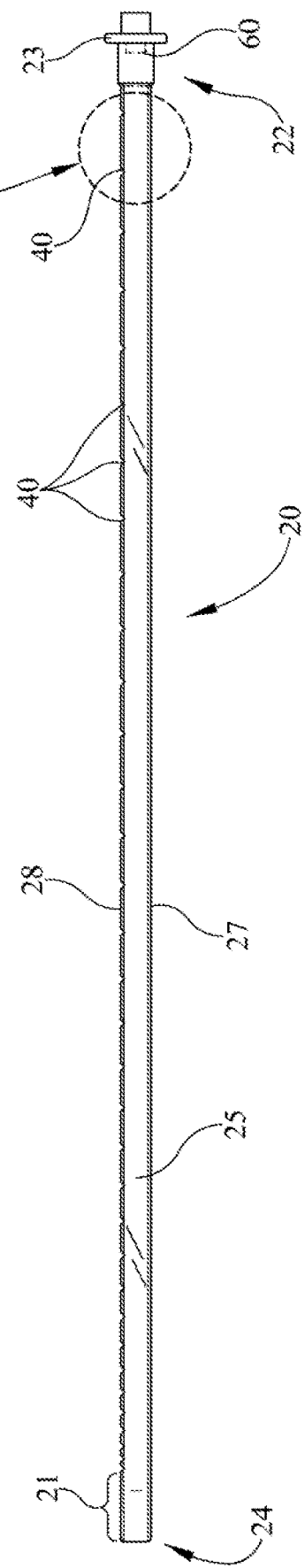
FIG. 4 illustrates a top view of a light panel described herein.

The various recesses formed in the light panels may extend horizontally or may extend vertically depending upon the position of the light entry surface which receives illumination output from the light emitters. In some embodiments, a light entry surface may be positioned along a side surface, such as in the present examples but alternative light entry surfaces may be implemented in alternative embodiments. As presented in the figures, a plurality of LEDs 60 may illuminate a light entry surface adjacent to the LEDs, as shown in FIG. 4. Light emitted by the plurality of LEDs may enter into the interior of the light guide and reflect internally through total internal reflection until such reflection disrupted thereby causing the light to exit through the front surface 27 of the light guide. Internal reflection can be modified and/or adjusted by virtue of the positioning of the grooves 40 and also by positioning of the LEDs along the side of the light guide. Internal reflection can be further improved through various alternative constructions of the light guide and/or material thereof. For example, the light guide 20 may include a reflective surface along a rear surface thereof to enhance or increase total internal reflection, thereby only allowing light output along a front surface if the reflector is positioned on the rear surface. In some examples, the internal reflection can be controlled by the thickness of the light guide and/or the construction material and or positioning of the disruption surfaces.

As shown in the embodiment of FIG. 4, the first light panel 20 may include a flange 23. The flange 23 may be adjacent the proximal end 22 of the first light panel 20. The flange 23 may extend outwardly from the proximal end 22. In the one embodiment shown, the flange 23 extends radially outward from each one of the front surface 27, back surface 28, top surface 25, and bottom surface 26. The flange 23 may be contained within the casing/heat sink for attachment. Flange 23 may be utilized to fixate the light panel in relative position with respect to the plurality of LEDs 60 in order to properly fixate and place the light entry surface of the light panel relative to the plurality of LEDs 60. The flange 23 may fit within retention receptacles interior casings 51, 53 such that each of the panels are fixated within the housing. For example, the front and the back of the casing may separate opening the interior of the casing construction and/or casings and allowing the panel to be positioned relative to the LEDs. Connection of the first and second halves of the casings fixates the panel into position and attachment of the front and back sections to each other may be accomplished, in embodiments, using screws or other mechanisms.

Alternative constructions to fixate the panels within the housing and casings may be utilized including compression or other mechanical techniques including adjustable clamps or members, channels embedded within the housing or studs instead of a continuous flange formed on the distal surface of the light panel. The casings 51, 53 may be a two piece construction to compress against the end of the respective light panel thereby retaining the light panel in place by virtue of the flange 23 and a mechanically restrictive connection between the light panel, flange and the respective casing. Alternative constructions for the casings to retain the panel may be utilized such as a channel that slidingly receives the flanged end of the light panel. For example, the casing may have a matching flanged shaped channel in which the end of the panel slides and which has an abutment surface on a lower or upper end opposite the entry position of sliding the panel. In examples, the casing may have tightening screws or compression members which clamp down on the positioned panel thereby preventing the panel from being removed. In some embodiments, the channel can be formed on the upper or lower surface of the casing allowing the panel to be slid into position with accessible screws to clamp the panel into position.

The first light panel 20 may be a translucent plate as shown in the Figures. It should be understood that the one or more light panels may be a variety of shapes (e.g. round, curved), sizes, quantities, and constructions. The first light panel 20 with V-shaped recesses 40 may be manufactured in a variety of methods and ways. One method may be injection molding the first light panel 20 with the light scattering structures (e.g. V-shaped recesses). However, in some embodiments, the V-shaped recesses 40 may be laser etched and/or machined within the one or more surfaces of the light panels. The light panels 20, 30 may be made from a variety of materials. In one example, the first light panel may be made of one or more plastic materials such as but is not limited to acrylics, polycarbonate, polymethyl, methacrylate, polystyrene, copolymer of methylmethacrylate and styrene, and any suitable combination thereof. In alternative embodiments, the laser etching or other disturbance features may be formed in the light panel to disrupt the internal reflection of the light. Such disruption features can be formed internally or along an exterior surface of the light panel.

In various implementations, the first light panel 20 may be configured to illuminate from a light source 60 adjacent the proximal end 22. With the density of the plurality of V-shaped recesses 40 increasing with increasing distance from the light source, the illumination and/or uniformity away from the light source 60 is improved. In the one embodiment shown, the first light panel 20 may include a 20% wall wash away from the back surface 28 and opposing 80% illumination in the opposing or front direction away from the front surface 27. Increasing the density of the V-shaped recesses or disruptions further away from the light entry surface allows for increased disruption of internal reflection at an increased distance from the light entry surface. As a result, uniform light output can be obtain by increasing disruption surfaces or features further away from the LEDs where the illumination level has diminished. Thus, by increasing the disruption surfaces at the opposite end of the light entry surface, even light output distribution may be achieved.

Referring to FIG. 4, the one embodiment of the first light panel 20 includes one or more light sources 60. The light source 60 may be adjacent the proximal end 22 of the first light panel 20. In the embodiment shown, the light sources 60 are one or more plurality of LEDs. The plurality of LEDs may be positioned along the proximal end 22 between the top surface 25 and the bottom surface 26. Both the first and second light panels 20, 30 may include a plurality of LEDs mounted therein which may be electrically controlled by a control and/or driver circuit either at the individual LED positions, by a combined LED lighting driver control or by segmented illumination driver/control for the individual first and second light panels. In some implementations, the LEDs may be individually controlled or may be controlled by each panel for, among some aspects, color and light intensity. For example, in various embodiments, the light intensity may be changed from 0% to 100% and/or the color temperature may be changed between 3000K and 5000K. Such driver control could be through standard known modulation and or alternatively voltage/current control techniques. Driver control circuitry for LED illumination may be incorporated at the individual respective first and second light panels, at the individual emitter or may alternatively be provided in a combined LED driver controller which could be positioned within the fixture, singular light panel, mounting housing or junction box.

The plurality of LEDs positioned along the light entry surface of the light panel may be mounted on an LED PCB which may include associated lens or other light direction and/or concentration surface to control the light entry of the illumination into the light guide. The LED PCB may be maintained and held in place within the heat sink of the fixture adjacent to a light guide holding structure to maintain the light guide in direct and light entry arrangement with respect to the LED PCB. Many known LED constructions may be implemented to correctly position and focus the light from the emitters to the light entry surface of the light guide. The LED PCB may include incorporated therein an LED controller to control the power supplied to the LEDs and also to control the characteristics of the light output. The LED driver (not shown) may control all of the LEDs on the fixture 80 or may be provided to in a group of controllers to control groups or segments of LEDs. The drivers may also be incorporated at the individual emitter. Such LED drivers can control light output by controlling the waveform or electrical power supplied to the LED emitter. Further, such controller may control the color temperature, color and the lumen output of the individual LEDs and also the entire luminaire.

Figure 3:
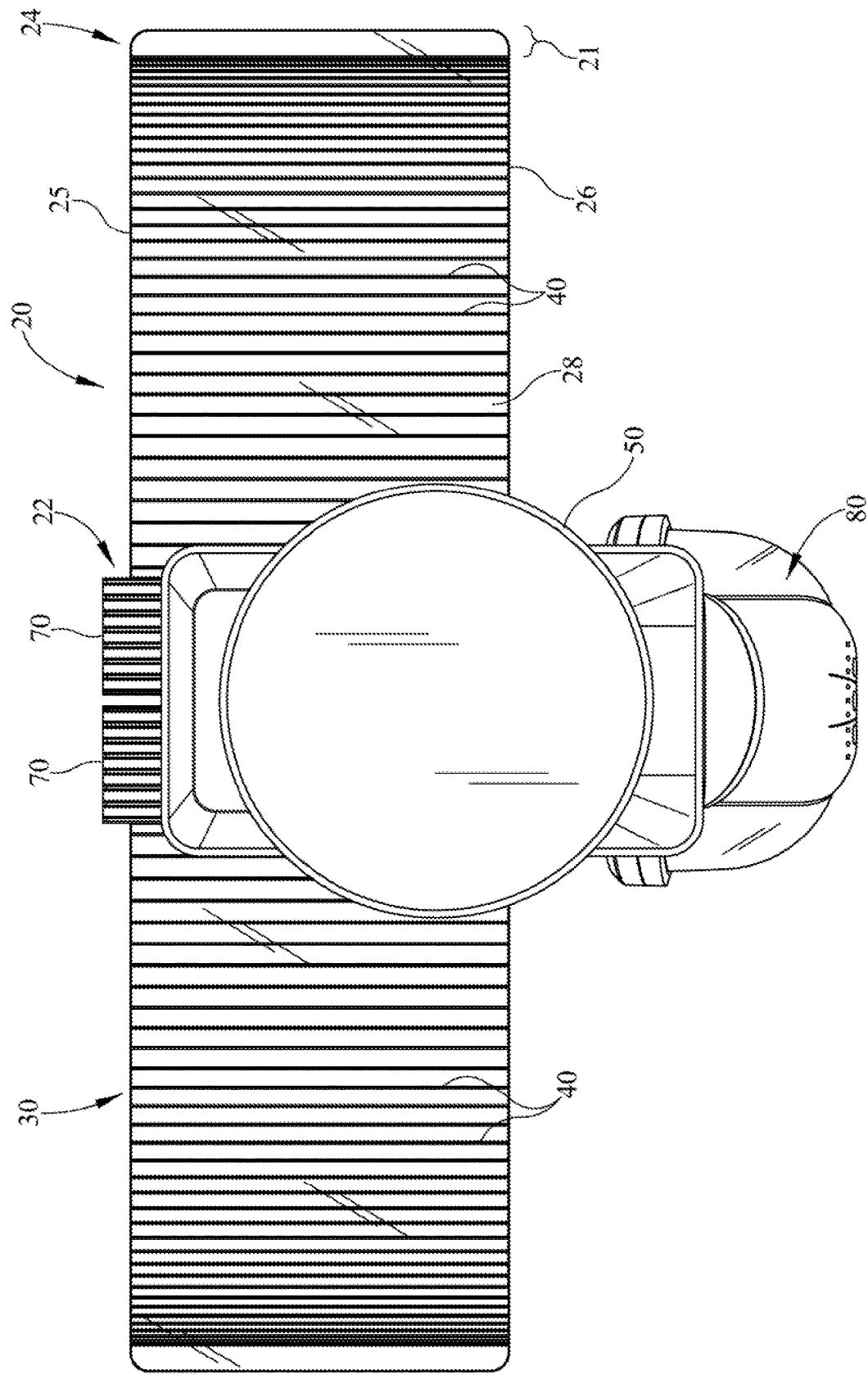
FIG. 3 illustrates a rear view of the security light described herein.

As shown in FIGS. 1-3, the first and second light panels 20, 30 or fixture 10 may include one or more heat sinks 70. The heat sink 70 may be positioned adjacent the light source 60 and/or LED PCB on which the LEDs are mounted along a proximal end 22, 32 of the first and second light panels 20, 30. The heat sink 70 may include a plurality of fins and is in thermal engagement with the LED PCB to receive heat therefrom and allow such heat to dissipate. In the embodiment shown, the fins are projecting away from the back surface of the first light panel. As shown in the one embodiment, the heat sink 70 is adjacent the proximal end 22 of the first light panel 20 and a second or another heat sink 70 is adjacent the proximal end 32 of the second light panel 30. Although, a heat sink is shown with each light panel, it should be understood that a single heat sink may have two or more light panels attached thereto in some embodiments.

As shown in the figures, the first and second light panels 20, 30 may be orientated in a variety of ways relative to each other. In the one embodiment, the proximal end and/or heat sinks of each of the first and second light panels are adjacent each other. The first and second light panels extend away from each other in opposing directions towards their respective distal ends. In some embodiments, the light panels may be in substantially the same plane in one or more configurations. In other configurations, the light panels may not be in substantially the same plane. In some implementations as shown, the heat sink mounted on a repositionable bracket or mounting structure can swivel the heat sink which holds the light guide and which holds the LED electronics, etc.

In various implementations, the first and second light panels 20, 30 may be connected to the base mounting 50 via first and second support arms or connecting arms 52, 54. Each respective connecting arm 52, 54 may be received in respective casing 51, 53 formed on the respective rear surface of the first and second light panels 20, 30 and/or heat sinks 70. Mounting base 50 may be mounted directly to a junction box or other electrical mounting connection as known in the art. Typical wiring and mounting bars may be provided in aspects to allow for direct mounting to a surface of a building. In variations, direct wall mount or ceiling mount may be provided by varying the position of the mounting base 50 and control arms 52, 54. It should be understood that the support or connecting arms 52, 54 may be connected to the light panels and base mounting by a variety of connections allowing a change in positions of the light panels (e.g. ball joint connections and/or one or more hinges, etc.). Also, the arms 52, 54 may be connected directly to casings 51, 53 which hold the panels in place while the arms allow the panels to be adjusted relative to the position of the base.

As illustrated, the first and second light panels may be independently moved relative to each other. The arms 52, 54 may allow each first and second light panel to be adjusted to a variety of positions relative to each other. However, in some embodiments, the first and second light panels may be adjusted in unison or together between one or more positions. The casings 51, 53 may be utilized to support and constrain respective first and second light panels in relation to the plurality of LEDs and the LEDs can be mounted within each of the respective moveable casing 51, 53. Thus, the panels and the light output may be adjustable as a result of the independently movable connection of the arms relative to the base mounting 50. Thus, translucent light panels are adjustably connected to the base mounting 50 and may be moved relative thereto and independent of each other.

In addition, a sensor head 80 may be electronically and/or electrically connected to the mounting base 50. As shown in the Figures, sensor head 80 may extend outwards and have fully operational motion sensing electronics using known techniques. Sensor head 80 may incorporate the use of multiple or single mounted PIRs, radar, sonic and or laser range finding, among various technologies known to electronically determine movement of people and/or animals. Such technology may include heat signatures, range finding and or distance measurement algorithms and other techniques which may be electronically implemented in the sensor head, combined with electronics of the security light 10 or positioned off-fixture. Sensor head 80 may also be mounted, in embodiments, directly onto the mounting base or may be separable from the base and communicate directly to control and/or other electronics of the security light 10 so that the light panel may be positioned separately from the mounted position of the security light. By electronically connecting the sensor head to the control electronics of the security light presently described, both wired and non-wired connections can be supported.

In embodiments, the security light 10 may incorporate additional sensing devices such as optical sensors to determine ambient light levels such as a photocell, allowing the security light to come on at dusk. Such optical sensors may also be combined with other location finding techniques allowing the security light 10 to determine location and time zone and correlating location with pre-determined or calculated sunset and sunrise times. Alternatively, the lighting controller may have associated electronics and memory to allow programming of customer/installed desired on/off times after dusk, illumination ON times after sensing motion, full dusk to dawn illumination, partial or lower light intensity dusk to dawn illumination for the entire period or for user defined periods, modification of intensity levels, or other customer desirable modifications. Further, the controller may further be configured to sense a hard 'reset' or active 'ON' by manual switching OFF then ON of the power at the switch by the user. In some implementations, cameras and/or voice control may be used to control the characteristics of the light panels/security light. All of such features may be incorporated into controller programming where a micro-processor executes instructions stored in an associated memory, or in alternative or combined configurations, some or all features may be implemented with associated circuit controls incorporated into the controller.

In some implementations, it may be desirable to allow the User to reprogram the delay times, sensitivity of the PIR and or motion sensors, light intensity levels and color, color temperature, sensitivity and or triggering of the optical sensors for dusk and dawn determination, as well as ON times and lower illumination times and or levels. Such reprogramming may be implemented with switches at the security light, or may be readily implemented with associated reprogramming by a user through a mobile programming device, such as a phone or dedicated remote control. Such reprogramming capability may require implementation of communication channels for both transmission and receiving commands from a remote source. Corresponding applications may be implemented for modification of such features on a user mobile device. In some embodiments, a wireless connection may be established according to various wireless standards such as WiFi, Bluetooth, or Zigbee to vary the light output of the first and/or second light panels. Other types of wireless links may be used.

For example, a user may select and/or modify ON time after the motion sensor detects motion while also selecting the illumination intensity, such as dimming the illumination levels slowly during change in state. In alternative embodiments, the user may select and/or modify the specific colors utilized by the light panels, if supported, and may include user modification of the color temperature. Such modifications may be implemented either for each light panel or individually for a single light panel.

In some embodiments, user specified alternative modifications may further include flashing or blinking lights of each or both light panels under predefined conditions. For example, in some implementations, one or more light panels may be programmed to flash intermittently to indicate an alert or warning condition, such as the detected interruption of power. Alternatively, a flashing alert or warning condition may be implemented by programming or user adjustment of controls by one or more light panels upon detection of motion while concurrently increasing illumination intensity of one or more light panels.

In implementations, LEDs may be connected to a power supply which provides electrical power to each LED. The power supply utilized in security lighting may be a standard converter to provide adequate and appropriate electrical supply to the individual LEDs via driving circuits, as discussed. The power supply may accept standard 110V AC line voltage and modify it accordingly to provide to the individual LEDs. Such modifications may include AC to DC conversion, PWM drivers, smoothing or chopping circuits and the like as are well-known in the art to provide adequate power to the LEDs.

In some implementations, the LEDs may further include color LEDs to provide variability in color and/or color temperature. Color may be implemented by various techniques including known color mixing of predefined color LEDs, modifying color output using luminescent materials, driving LEDs at varying intensity to meet color output requirements, among other known implementations.

Various implementations for drivers of the LEDs may be utilized including microprocessors, the linear AC drivers are constant current regulators. In other embodiments, the linear AC drivers are ASICs. Other drivers may be used. The LEDs may be provided as arrays, individual emitters, any of which may be directly addressable and hence drivable by control and/or micro-processors and included programming stored on available and accessible memory. Such may include in implementations, current regulators, voltage regulators, micro-controllers and other known circuitry to maintain illumination levels and other characteristics of the LEDs.

In some implementations, the security light may include a battery back-up such that the batteries (e.g. rechargeable), when at a predetermined and specified voltage or condition, provide power to the illumination sources. The battery backup may also be operably connected to the power supply and associated electronics or controller.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A security light with dual opposing translucent light panels, comprising:
    a mounting base adjustably connected to a first and a second casing;
    a first translucent light panel retained within the first casing and extending outward and away from the casing, the first casing having a plurality of LEDs positioned along a light entry surface of the first light panel, the first light panel extending outward and away from the first casing and the plurality of LEDs in the first casing, the plurality of LEDs in the first casing emitting light into the light entry surface and causing total internal reflection of the light through the first light panel;
    the first light panel having a plurality of V-shaped grooves on a rear surface and extending from a top edge of the first light panel to a bottom edge of the first light panel, the plurality of V-shaped grooves having a varying density, the varying density increasing in relation to a distance from the first panel light entry surface, the plurality of V-shaped grooves in the first light panel affecting the light output of the first light panel;
    wherein the translucent first light panel is adjustable relative to the mounting base;
    a second translucent light panel retained within the second casing and extending outward and away from the casing, the second casing having a plurality of LEDs positioned along a light entry surface of the second light panel, the second light panel extending outward and away from the second casing and the plurality of LEDs in the second casing, the plurality of LEDs in the second casing emitting light into the light entry surface and causing total internal reflection of the light through the second light panel;
    the second translucent light panel having a plurality of V-shaped grooves on a rear surface and extending from a top edge of the second light panel to a bottom edge of the second light panel, the plurality of V-shaped grooves having a varying density, the varying density increasing in relation to a distance from the second panel light entry surface the plurality of V-shaped grooves in the second light panel affecting the light output of the second light panel;
    wherein the second translucent light panel is adjustable relative to the mounting base; at least one passive infrared sensor adjustably mounted to the mounting base;
    a lighting controller electronically connected to the PIR and to the plurality of LEDs positioned along the light entry surface of the first light panel and the plurality of LEDs positioned along the light entry surface of the second light panel to control the light output of the plurality of LEDs positioned along the light entry surface of the first light panel and the second light panel.

2. A security light comprising:
    a mounting base coupled to a sensor head;
    a first and second light panel coupled to the mounting base, each one of the first and second light panel include a proximal end and a distal end, wherein each of the first and second light panel includes a top and a bottom surface and a front and back surface extending between the proximal end and the distal end;
    at least one heat sink adjacent the proximal end of each of the first and second light panels;
    the proximal end of each of the first light panel and the second light panel form a respective light entry surface and each are adjacent a plurality of LEDs; and
    the back surface of each of the first and second light panel include a plurality of V-shaped recesses increasing in density with increasing distance from the proximal end towards the distal end, wherein the plurality of V-shaped recesses extend between the top surface and the bottom surface of the respective first and second light panel; wherein the distal end of each of the first and second light panels have a region without the plurality of V-shaped recesses to decrease the light emitting out the distal end of the light panel and increase the light emitting out the front surface.

3. The security light of claim 2 wherein each of the plurality of V-shaped recesses include two angled surfaces, wherein the two angled surfaces are 95 degrees from each other.

4. The security light of claim 2 wherein the proximal end of each of the first light panel and second light panel are adjacent to each other and extend away from each other in opposing directions towards the distal end of each respective first light panel and second light panel.

5. The security light of claim 2 wherein the proximal end of the first light panel is connected to a first support arm extending from the mounting base and the proximal end of the second light panel is connected to a second support arm extending from the mounting base.

6. The security light of claim 2 wherein the first light panel and the second light panel move independently of each other.

7. The security light of claim 2 wherein the at least one heat sink includes a first heat sink adjacent to the proximal end of the first light panel and a second heat sink adjacent the proximal end of the second light panel.

8. The security light of claim 2 wherein each one of the first and second light panels includes a flange adjacent the proximal end.

9. The security light of claim 2 wherein each of the plurality of V-shaped recesses includes a bottom, wherein the bottom extends between the top surface and the bottom surface.

10. The security light of claim 9 wherein the bottom of each one of the plurality of V-shaped recesses is a depth of about 0.4 inches from the back surface.

11. The security light of claim 2 wherein each one of the first and second light panels are translucent.

* * * * *